Oct. 3, 1967     H. P. FLACK ET AL     3,345,437
SOL-GEL MICROSPHERE FORMING PROCESS USING DISSOLVED
AMMONIA IN THE DEHYDRATING SOLVENT
Filed Nov. 3, 1965
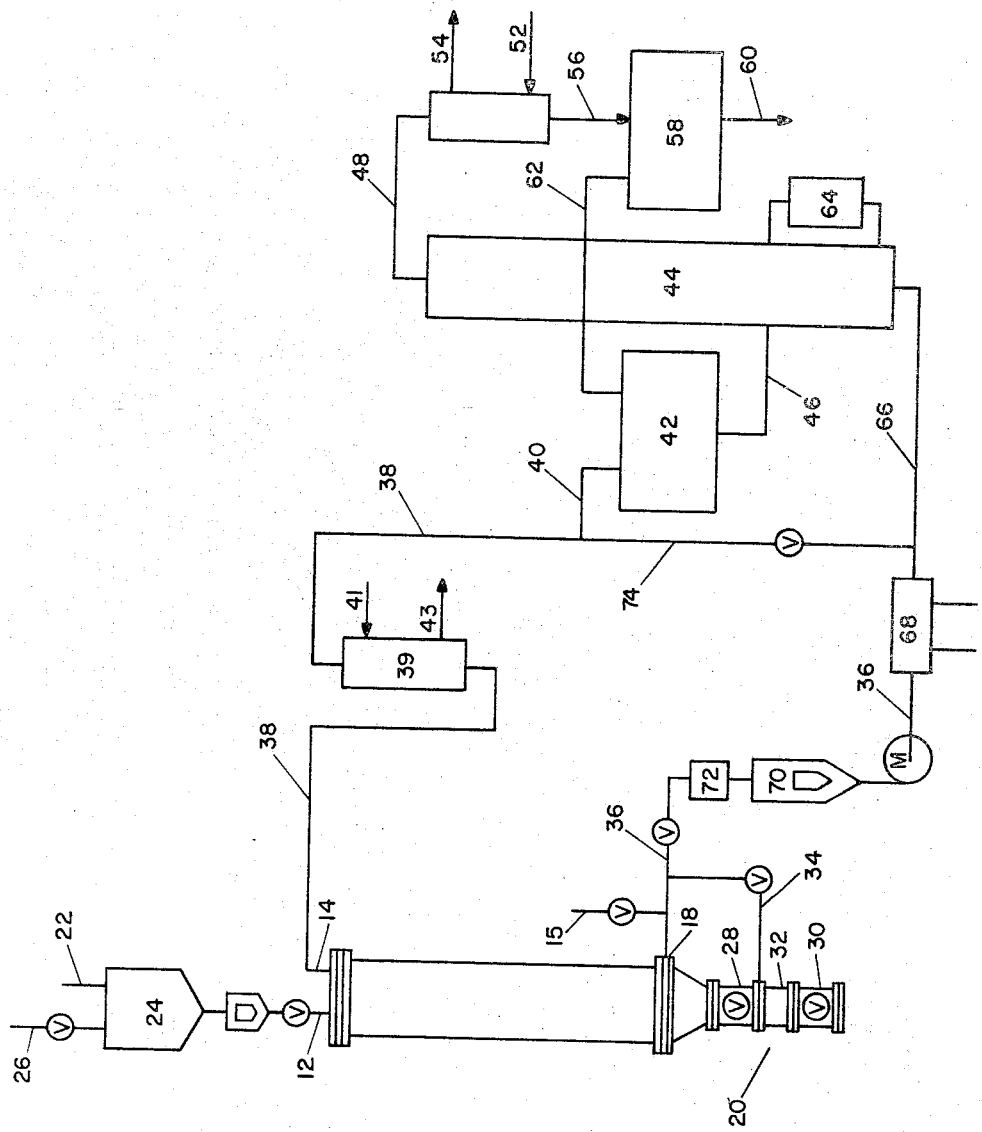
HERBERT P. FLACK—INVENTORS
MOISES G. SANCHEZ
CHARLES T. LAMBERTH
BY *William B. Walker*
ATTORNEY

United States Patent Office 3,345,437
Patented Oct. 3, 1967

3,345,437
SOL-GEL MICROSPHERE FORMING PROCESS USING DISSOLVED AMMONIA IN THE DEHYDRATING SOLVENT
Herbert P. Flack, Ellicott City, Moises G. Sanchez, Severna Park, and Charles T. Lamberth, Woodbine, Md., assignors to W. R. Grace & Co., New York, N.Y., a corporation of Connecticut
Filed Nov. 3, 1965, Ser. No. 506,231
5 Claims. (Cl. 264—.5)

This invention relates to a process for producing highly uniform metal oxide microspheres.

In summary, this invention is an improvement of a process for forming microspheres of metal oxides from an aquasol of a metal oxide selected from the group consisting of uranium dioxide, uranium trioxide, thorium dioxide, plutonium dioxide, plutonium trioxide, zirconium dioxide, beryllium oxide, yttrium oxide, and mixtures thereof, and aquasol mixtures of said metal oxide aquasol with from 0 to 5 moles of colloidal carbon per mole of metal in the mixture. In the process the aquasol is introduced into a dehydrating solvent in the form of droplets, and partially dehydrated microspheres are recovered from the dehydrating solvent. This invention is an improvement of the process comprising introducing the aquasol into a dehydrating solvent containing a quantity of dissolved ammonia sufficient to provide a dehydrating solvent pH within the range of from 8 to 13.5. The preferred pH range of the dehydrating solvent is from 8.5 to 10.0. The aquasol feed can contain an ammonia releasing agent. The preferred ammonia-releasing agents comprise hexamethylenetetramine, acetamide, ammonium carbamate, ammonium cyanate, urea, and mixtures thereof. The ammonia-releasing agent can be present in the aquasol feeds employed in the process of this invention in a quantity sufficient to adjust the aquasol feed pH to less than 0.1 pH units below the gelation pH of the aquasol feed. The dehydrating solvent preferably has a solubility for water of from 1 to 30 weight percent. The microspheres are preferably dried to a water content of less than 50 weight percent before they are recovered from the dehydrating solvent.

Actinide metal oxide have become of paramount importance in the field of nuclear fuels. Current reactor designs, especially the designs of the high temperature gas-cooled reactors, have placed very demanding requirements on the fuel employed. The fuel must be resistant to oxidation and fission product release. The fuel must be near theoretical density to provide the requisite efficiency. The fuel elements are usually formed by dispersing the fuel materials in a ceramic matrix which is then pressed or compacted into the desired shapes under high pressures, and the fuel material must be sufficiently strong to withstand the severe stresses present during compaction. Furthermore, the particles must have a uniform shape and size to effect a homogeneous concentration of fuel in the matrix.

Use of the fuel materials, actinide oxides and carbides, in the form of spherical particles met the requirements. The spherical shape provided the requisite strength. Resistance to oxidation and fission product release was obtained by coating the spherical particles with a refractory metal, metal oxide or pyrolytic graphite. However, great difficulty was encountered in obtaining uniform particles size, particularly since microspheres found suitable for this application were in the 50 to 200 micron diameter range.

The original technique developed to produce microspheres having a uniform size and shape was laborious, expensive, and had a very low yield. The product obtained lacked sphericity, uniform structure, regular surface, and the requisite strength. Ceramic powders were ground, compacted, crushed to the desired shape, shaped into spheroids by abrasion techniques and sintered to form the particles. At several stages in the process, the powder and particles were sized, and the outsized particles were recycled. Generally, yields of less than 20 percent were obtained in each step, rendering the process very inefficient and expensive.

The general process for the production of microspheres by solvent dehydration of aquasol droplets has been previously disclosed. In the previously disclosed process, the sol droplets were injected into a dehydrating solvent and recovered from the solvent in a dehydrated form. Since a large volumeric proportion of the droplet, as water, was removed in the process, the size of the droplet was greatly diminished during the dehydration. The microspheres formed by this process were often found to be pitted, cracked, and to contain internal voids. By carefully controlling the process, the proportion of defective spheres could be lowered. However, the requisite control was extremely difficult, and the process still produced a significant proportion of defective microspheres. One solution to this problem has been previously disclosed. It was found that if the aquasol feed was mixed with an ammonia-releasing agent and the temperature of the dehydrating solvent was sufficiently high to cause substantial decomposition of the ammonia-releasing agent in the aquasol droplets introduced into the dehydrating solvent, a far superior microsphere product was produced. However, it has been found that the improved process could not always be conveniently followed. When the ammonia-releasing agent was mixed with the aquasol materials and not immediately employed to form microspheres, it was necessary to take precautions to inhibit even slow ammonia release and aquasol gelation during extended storage. Furthermore, the improved process often required the use of higher solvent temperatures.

It is an object of this invention to provide an improved process for making microspheres having an improved uniformity of surface and density from metal oxide aquasols and mixtures thereof with colloidal carbon.

It is another object of this invention to provide an alternative process for making microspheres which does not require premixing the aquasol with an ammonia-releasing agent, and which does not require the higher solvent temperatures which are sometimes required to decompose the ammonia-releasing agent.

It is still another object of this invention to make microspheres cores containing metal oxide or metal oxide-carbon mixtures by contacting an aquasol of the metal oxide, with or without colloidal carbon, with a dehydrating solvent containing dissolved ammonia.

The figure schematically illustrates an apparatus for carrying out the process of this invention.

In general, the process of this invention comprises introducing a metal oxide aquasol, which can contain colloidal carbon, in the form of droplets in a dehydrating solvent containing dissolved ammonia and recovering partially dehydrating microspheres from the dehydrating solvent. The dehydrating solvent contacts the falling aquasol droplets countercurrently. The dehydrated solvent is removed from the system and transferred to a recovery system from which it is reintroduced into the extraction column.

Referring to the figure, the extraction column 10 is equipped with a sol introduction means 12, a dehydration solvent outlet 14, an extraction solvent inlet 18, and a spherical particle outlet 20 at the lower end of the column. The sol introduction means 12 is connected to a sol dispensing means comprising sol reservoir 24, sol inlet means 22, and an air pressure supply means 26, whereby the sol in the reservoir 24 may be supplied under air pressure to the sol introduction means 12.

The sol can be introduced into the column in several ways. The sol can be injected directly into the top of the column through a hypodermic needle or other small tube and allowed to form droplets in the upflowing dehydrating solvent. The sol can also be injected, through a small tube into a concurrently flowing stream of dehydrating solvent, allowed to form into droplets, and then can be introduced into the countercurrently flowing stream of dehydrating solvents as disclosed in application Ser. No. 364,931, filed May 5, 1964. Alternatively, the sol can be emulsified to form a dispersion of sol droplets which are introduced into the top of column 10. Any technique by which sol suspension droplets can be formed and/or introduced into the top of column 10 can be employed in the apparatus with such modifications as would be obvious to a person skilled in the art.

The spherical particle outlet 20 can comprise a first valve 28 connected to, and in communication with, the bottom of the column 10, a second valve 30 having an inlet and an outlet, and an intermediate chamber 32 communicating with the outlet of the first valve and the inlet of the second valve. Flushing fluid inlet conduit 34 is connected to the extraction solvent inlet conduit 36 and delivers purified solvent to the chamber 32 for flushing the spherical particles therefrom through the second valve 30.

Alternative systems which do not require the use of a double valve and flushing line can be employed to remove the dehydrated microspheres from column 10. The microspheres can be removed by suction or by means of an automatic discharge valve. However, the means chosen must not greatly disturb or disrupt the column operation and process conditions.

In the solvent recovery means, extraction solvent removed from the extraction solvent outlet 14 is delivered through a conduit 38 connected therewith to the solvent inlet 40 connected therewith, and therethrough to the extraction solvent reservoir 42 of the distillation means. Removal of extraneous dissolved substances from the extraction solvent can be obtained by interposing extraction column 39 in line 38. Extraction line 39 can comprise a countercurrent extraction solvent-water extraction system wherein the extraction solvent enters the bottom of the column and exits from the top thereof. Water can be introduced at the top of the column through line 41 and can exit from the column at the bottom through line 43. The water content of the solvent must be lowered to permit its reuse. Solvent from the reservoir 42 is transferred into the bottom of the distillation column 44 through connecting conduit 46 by gravity flow, pumping or other suitable means. In the column the water contained in the extraction solvent, together with a portion of the solvent, is vaporized and passed through the column through conduit 48 connected there to a condenser 50 having a cooling water inlet 52 and outlet 54. The condensate from the condenser 50 then passes through a connecting conduit 56 to the water-solvent separating tank 58. The water fraction is discharged to waste through conduit 60, and the separated solvent recycled from the separating tank 58 through connecting recycle conduit 62 to the solvent reservoir 42. The distillation column can be heated by passing a portion of the solvent through heater 64 communicating therewith and returning it to the bottom of the distillation column 44. The partially dewatered extraction solvent is then taken from the bottom of the extraction column through conduit 66 for return to the extraction column 10. Other equivalent dewatering systems can be employed.

The water content of the solvent in the distillation column can be regulated by controlling the temperature of the solvent in the column. The column temperature can be raised, for example, by raising the temperature of the heater 64 or by increasing the quantity of solvent recycled therethrough in large systems.

The dewatered solvent is passed through connecting conduit 66 to heat exchanger 68 for temperature control of the extraction solvent to be introduced into the extraction column 10. The solvent is then passed through connecting conduit 36 having a flow meter 70, such as rotometer, and having a temperature measuring means 72, such as a thermometer or a thermocouple connected to a temperature indicating meter in the line thereof. Bypass line 74 connects the solvent distribution line 38 and the dewatered solvent distribution line 66 for introducing controlled quantities of solvent containing a higher proportion of water, whereby predetermined water concentrations in the purified solvent stream can be further regulated.

When the dehydrating solvent recovery system is employed with the sol introduction system disclosed in application Ser. No. 364,931, an additional by-pass line (not illustrated in the drawing) from conduit 36 to the sol introduction means can be provided with appropriate flow control, metering and temperature control devices.

In the process of this invention, ammonia is introduced into the dehydrating solvent. The ammonia can be introduced by several techniques. For example, the water passed through extraction column 39 can be ammoniated, whereby ammonia is introduced into the dehydrating solvent. Alternatively, gaseous ammonia can be introduced directly into the extraction column 10 through line 15, for example.

The system operates as follows: By means of air pressure from line 26, the sol is forced from reservoirs 24 at a controlled rate to the top of column 10 where it is introduced in the form of, or to form droplets. In column 10 the dehydrating solvent enters at inlet 18 and exits at outlet 14. The exiting solvent, which contains an undesired excess of water, is fed to reservoir 42 through conduit 38 and 40.

The solvent in reservoir 42 is continuously fed through line 46 into distillation column 44 where it is vaporized. The vapors are removed through conduit 48, are condensed by heat exchanger 50, and are fed to separator 58. The water fraction separating therefrom is discharged through conduit 60, and the solvent remaining in 58 is recycled to reservoir 42.

A portion of the solvent having a predetermined water content, reflected by the boiling temperature of the liquid in the distillation column 44, is continuously removed therefrom for reuse. The reconditioned solvent is fed through line 66 to heat exchanger 68. Further control or variation of the water content of the reconditioned solvent can be obtained by introducing solvent from conduit 38, which has a high water content, into conduit 66 through conduit 74. The solvent having the desired temperature is removed from heat exchanger 68 and is fed into the dehydration column through inlets 18. The rotometer 70 and temperature measuring device 72 aid in controlling the system. If a double valve such as shown in the figure is employed in the system, a portion of the reclaimed solvent can be by-passed through line 34 to flush accumulations of microspheres through valve 30 during the discharge cycle.

Metal oxide aquasols which are suitable for use as feed materials in the process of this invention are well known in the art. Suitable aquasols include aquasols of metal oxides such as uranium dioxide, uranium trioxide, thorium dioxide, plutonium dioxide, plutonium trioxide, and diluent oxides such as zirconium dioxide, yttrium oxide and beryllium oxide. Microspheres suitable for the formation of metal carbide microspheres can also be made by the process of this invention. Carbide microspheres can be produced from microspheres containing a mixture of metal oxide and colloidal carbon. The process of this invention can be employed to produce microspheres containing an extremely intimate, uniform metal oxide-carbon mixture from metal oxide aquasols containing dispersed colloidal carbon. The metal oxide-carbon aquasols can be made by several simple techniques. Fine-sized carbon such as Mogul A and Regal SFR–S produced by Cabot Corporation are suitable. Carbon dispersion in the aquasols can be easily obtained by adding the carbon to the aquasol and dispersing the carbon with an ultrasonic probe. Alternatively, the carbon can be dispersed in water containing a dispersing agent by use of an ultrasonic probe or a high shear mixer, and the aquasol can be added to the carbon suspension. The particular technique employed for obtaining the carbon dispersion in the aquasol is not critical. The quantity of carbon dispersed in the aquasol can range from 0 to 5 moles of carbon per mole of metal in the mixture.

In application Ser. No. 449,867, filed Apr. 21, 1965, a process for forming metal oxide and metal oxide-carbon microspheres from the corresponding aquasols was disclosed wherein an ammonia-releasing agent was employed in the aquasol feed. These ammonia-releasing agents are compounds which, when heated above room temperature, provide a substantial release of ammonia by thermal decomposition, but which are relatively stable at ambient or room temperatures. The action of the ammonia-releasing agents can be supplemented by adding ammonia to the dehydration solvent. This permits the use of smaller concentrations of the ammonia-releasing agent. Furthermore, the process of this invention can be used in substitution for the process employing the ammonia-releasing agent when an extended storage of the sol feed is required. Because of the low rate of reaction and ammonia release at ambient temperatures of the ammonia-releasing agents, these compounds can be added to the metal oxide aquasols at room temperature without causing an immediate reaction. For extended storage of the sol-ammonia releasing mixture, cold storage is required. When the aquasol droplets are heated by contact with the dehydration solvent, these compounds decompose rapidly to release ammonia. The ammonia reacts with the metal compounds present in the aquasol to form a metal oxide gel within the droplets. Examples of suitable ammonia-releasing agents are hexamethylenetetramine, acetamide, ammonium carbamate, ammonium cyanate, urea and mixtures thereof. The ammonia-releasing agent is preferably added to the aquasol just prior to the introduction of the feed materials into the dehydrating solvent. However, the ammonia-releasing agent can be mixed with the aquasol feed several hours before use if the mixture is maintained at low temperatures until just prior to use. The quantity of ammonia-releasing agent employed in the aquasol feeds can be, according to the process of this invention, an amount sufficient to form a metal oxide gel from the metal compounds present in the sol droplets when they are contacted with the dehydrating solvent and lesser amounts. The quantity of ammonia-releasing agent that can be employed can be from zero up to an amount sufficient to adjust to pH of the feed to 0.1 pH units below the gelation pH of the sol. The gelation pH of the aquasol feed is defined as the pH which will effect gelation of the sol within 15 minutes after the adjustment of the soil to this pH is made.

The choice of dehydrating solvents for this system is very important. The solvents giving the best results are the higher alcohols which have the desired solubility for water. The solvents must be inert, free of objectionable physical properties such as emulsifying tendencies, for example, and must have a density low enough to permit settling of the microspheres. If an ammonia-releasing agent is employed in the aquasols, the dehydrating solvent must be capable of being heated to a temperature which is sufficiently high to cause decomposition of the ammonia-releasing agent to release ammonia in the aqueous droplets introduced into this system. The solvent selected must have saturation concentrations with water within a certain range permitting adjustment of the drying conditions. Solvents with solubilities for water of from 1 to 30 percent have provided satisfactory results. Examples of preferred solvents include hexanol, ethyl-hexanol, and ethyl butanol. Solvents with water solubilities which are too high can be recirculated from the distillation pot still retaining a predetermining amount of water, whereby the effective water solubility is diminished. For example butanol, which has a hot solubility for water of about 28 weight percent, is nearly saturated with water when introduced into the column. In contrast ethyl-hexanol, which has a 4 to 6 weight percent hot solubility for water, is circulated to the column in nearly anhydrous form. Hexanol, with a 10 to 11 weight percent hot solubility for water, is used with a water content of 3 to 6 percent.

The temperature of the dehydrating solvent entering the column generally ranges from about 60 to 120° C. while that leaving from the top of the column is generally from about 10 to 40° C. lower than the temperature of the solvent entering the column. Such temperatures are also sufficient for releasing ammonia within the aquasol droplets when most of the ammonia-releasing agents are employed.

The process of this invention is an improvement of the previously known microspheres processes, the improvement comprising introducing ammonia into the dehydrating solvent. The ammonia enters the microsphere droplets as they fall through the dehydrating solvent, gelling the metal oxide aquasol particles and providing a high quality microsphere product. Any quantity of ammonia can be employed in the dehydrating solvent which will provide adequate ammonia to the aquasol droplets. Lesser amounts are sufficient if an ammonia-releasing agent is present in the droplets. An amount sufficient to provide a dehydrating solvent pH within the range of from 8.5 to 10 have been found suitable, for example, for most processes.

The ammonia can be introduced into the dehydrating solvent by any suitable means. For example, referring to the figure, the ammonia can be introduced into the dehydrating solvent by providing ammoniated water in the extraction column 39. Alternatively, ammonia can be introduced in gaseous form through line 15 into the bottom of the dehydrating column 10.

The aquasol droplets are dried to a final water content of less than 50 percent and preferably less than 25 percent in the column. The partially dehydrated product microsphere may contain unreacted precipitating agent plus ammonium salts and other neutralization products. These must be removed prior to sintering. Therefore, the microspheres are treated with ammonia to fix the oxide components, then washed with water, and finally dried by heating in a stream of inert gas or in a vacuum. Preferably, microspheres are gradually heated from 40° C. up to 110° C. during drying. The resulting microspheres are then ready for sintering.

The improved process of this invention is further illustrated by the following specific but non-limiting examples.

*Example 1*

This example shows the preparation of microspheres of uranium dioxide by the process of this invention. In this example, ammonia was introduced into the dehydrating solvent from the water passed through the water extraction column 39 in the figure. The water wash with which the dehydrating solvent was contacted contained one part of a 28 percent ammonia solution per 5 parts of water.

The uranium dioxide aquasol employed was made in an electrolytic cell from a feed stock of uranyl chloride solution and hydrochloric acid, and had a concentration of 127 g. $UO_2$/liter and a pH of 1.95. The aquasol feed also contained a quantity of hexamethylenetetramine insufficient to produce good spheres by itself, providing a sol pH of 2.6. The hexamethylene tetramine-treated sol was formed into droplets by injecting it through a 23-gauge hypodermic needle into a 2.8 millimeter capillary through which a concurrent flow of hexanol was maintained. The droplets were injected into the top of a 7 foot column through which hexanol was pumped countercurrently. In Run 1 hexanol which had not been treated with ammonia was employed as the dehydrating solvent. In Run 2 the ammonia-treated hexanol dehydrating solvent was employed. The column conditions are shown in Table A.

TABLE A

|  | Run 1 | Run 2 |
|---|---|---|
| Sol feed pH | 2.6 | 2.6 |
| Sol feed rate, cc./min | 2.7 | 1.9 |
| Solvent pH | 4.4 | 8.4 |
| Solvent flow rate, cc./min.: |  |  |
| To needle assembly | 140 | 140 |
| To column | 410 | 410 |
| Solvent temperature, °C.: |  |  |
| To column | 102 | 101 |
| From column | 62 | 62 |
| To needle assembly | 30 | 30 |
| In distillation pot | 114 | 115 |

The product microspheres collected from the bottom of the column were soaked in a concentrated aqueous ammonium hydroxide solution for about 15 minutes, were washed with water until free from electrolytes, and were dried.

The microspheres formed in Run 1 were black, shiny ovals, all containing cracks. The product of Run 2, in contrast, was round, black spheres containing no fractures or craters.

*Example 2*

This example shows the preparation of uranium dioxide microspheres by the process of this invention. No ammonia releasing agent was employed in the sol feed.

In this example, uranium dioxide aquasol made by the procedure described in Example 1 was employed as the sol feed. The sol had a pH of 1.9 and contained 114 g. $UO_2$ per liter. In Run 3 the solvent was not ammoniated. In Run 4 gaseous ammonia was introduced into the dehydrating solvent.

The two sol samples were put through the column sequentially and the product treated as described in Example 1. The column conditions are shown in Table B.

TABLE B

|  | Run 3 | Run 4 |
|---|---|---|
| Sol feed pH | 1.9 | 1.9 |
| Sol feed rate, cc./min | 4.4 | 1.8 |
| Solvent pH | 5.5 | 9.0 |
| Solvent flow rate, cc./min.: |  |  |
| To needle assembly | 140 | 140 |
| To column | 410 | 410 |
| Solvent temperature, °C.: |  |  |
| To column | 100 | 101 |
| From column | 61 | 60 |
| To needle assembly | 30 | 29 |
| In distillation pot | 114 | 114 |

The product microspheres were ammonia treated, washed and dried as described in Example 1.

The product of Run 3 was microspheres, all of which were either fractured or cratered. The product of Run 4 consisted of good round balls having a size within the range of from 150 to 250 microns. This demonstrates that good microspheres can be formed from sol feeds which have not been treated with an ammonia releasing agent by the process of this invention.

*Example 3*

This example shows the formation of microspheres from a uranium dioxide-carbon aquasol by the process of this invention. In Run 5, no ammonia addition to the dehydrating solvent was employed. In Run 6, gaseous ammonia was introduced directly into the dehydrating solvent in column 10 through line 15 in the figure.

The $UO_2$ sol was made by the procedure described in Example 1. A dispersion of Regal SRF–S carbon was made using Daxad 11, a sodium salt of a polymerized alkylene sulfonic acid obtained from W. R. Grace & Co. The $UO_2$—C sol obtained contained 120 g. of solids per liter and had a carbon to uranium mole ratio of 4.4 to 1.

The sol samples, with and without ammonia treatment of the dehydrating solvent, were delivered to the column and the product was treated as described in Example 1. The column conditions are given below in Table C.

TABLE C

|  | Run 5 | Run 6 |
|---|---|---|
| Sol feed pH | 2.0 | 2.0 |
| Sol feed rate, cc./min | 3.2 | 3.5 |
| Solvent pH | 5.7 | 9.5 |
| Solvent flow rate, cc./min.: |  |  |
| To needle assembly | 140 | 140 |
| To column | 410 | 410 |
| Solvent temperature, °C.: |  |  |
| To column | 100 | 100 |
| From column | 62 | 62 |
| To needle assembly | 31 | 30 |
| In distillation pot | 114 | 112 |

The microspheres were ammonia-treated, washed, and dried as described in Example 1. The microspheres produced in Run 5 were fractured or contained large craters. In contrast, the microspheres produced in Run 6 were good round spheres having a size of from 200 to 300 microns.

*Example 4*

This example shows that a good $ThO_2$ sphere can be made by ammoniating the solvent. The $ThO_2$ sol was made by adding a urea solution to a thorium nitrate solution and heating to the boiling point. The resulting floc was settled, decanted, and redispersed with water. It was then passed through a mixed bed resin to remove traces of electrolyte. The resulting sol (containing 100 g. $ThO_2$ per liter) was used in the following tests. $NH_3$ gas was added to the hexanol entering the bottom of the column in Run 8, none being added in Run 7. The sol was fed to the column and the product treated as described in Example 1. The column conditions are shown in Table D.

TABLE D

|  | Run 7 | Run 8 |
|---|---|---|
| Sol feed rate, cc./min | 2.7 | 1.4 |
| Solvent pH | 4.1 | 8.7 |
| Solvent flow rate, cc./min.: |  |  |
| To needle assembly | 140 | 140 |
| To column | 410 | 410 |
| Solvent temperature, °C.: |  |  |
| To column | 101 | 100 |
| From column | 62 | 62 |
| To needle assembly | 30 | 30 |
| In distillation pot | 114 | 112 |

The microsphere product of Run 7 exhibited many fractures and deep craters. The product of Run 8 consisted of good white spheres having a size of from 140 to 220 microns.

*Example 5*

This example shows the formation of uranium dioxide microspheres using an unheated dehydrating solvent to which gaseous ammonia had been added. The uranium dioxide sol was made by the procedure of Example 1 and contained 170 g. of $UO_2$ per liter. The sol feed was introduced into the column as described in Example 1, and the column conditions are shown in Table E. Gaseous ammonia was added to the dehydrating solvent in Run 9. The products were treated as described in Example 1.

TABLE E

|  | Run 9 |
|---|---|
| Sol feed rate, cc./min. | 1.4 |
| Solvent pH | 10.0 |
| Solvent flow rate, cc./min.: |  |
| To needle assembly | 140 |
| To column | 560 |
| Solvent temperature, °C.: |  |
| To column | 42 |

TABLE E—Continued

|  | Run 9 |
|---|---|
| From column | 26 |
| To needle assembly | 26 |
| In distillation pot | 33 |

The product consisted of good spheres having a rough surface and having a size of from 115 to 230 microns.

Obviously many modifications and variations of the invention as hereinabove set forth can be made without departing from the essence and scope thereof, and only such limitations should be applied as are indicated in the claims.

We claim:

1. In a process for forming microspheres of metal oxides from an aquasol of a metal oxide selected from the group consisting of uranium dioxide, uranium trioxide, thorium dioxide, plutonium dioxide, plutonium trioxide, zirconium dioxide, beryllium oxide, yttrium oxide, and mixtures thereof, and aquasol mixtures of said metal oxide aquasol with from 0 to 5 moles of colloidal carbon per mole of metal in the mixture and wherein the aquasol in the form of droplets is introduced into a dehydrating solvent having a solubility for water of from 1 to 30 weight percent, and partially dehydrated microspheres are recovered from the dehydrating solvent; the improvement comprising introducing the aquasol into a dehydrating solvent containing dissolved ammonia.

2. The process of claim 1 wherein the quantity of ammonia dissolved in the dehydrating solvent is sufficient to provide a solvent pH within the range of from 8 to 13.5.

3. The process of claim 1 wherein the microspheres have been dried to a water content of less than 50 weight percent before they are recovered.

4. The process of claim 1 wherein ammonia is introduced into the dehydrating solvent by contacting it with an aqueous ammonia solution.

5. The process of claim 1 wherein gaseous ammonia is introduced into the dehydrating solvent.

References Cited

UNITED STATES PATENTS

| 3,171,715 | 3/1965 | Kleinsteuber | 23—345 |
| 3,171,815 | 3/1965 | Kelly et al. | 252—301.1 |
| 3,235,326 | 2/1966 | Slooten | 23—345 |
| 3,290,122 | 12/1966 | Clinton et al. | 23—345 |
| 3,300,284 | 1/1967 | Pilloton et al. | 264—.5 X |
| 3,312,631 | 4/1967 | Smith | 252—301.1 |
| 3,312,632 | 4/1967 | Smith | 252—301.1 |
| 3,313,602 | 4/1967 | Smith et al. | 23—345 |

CARL D. QUARFORTH, *Primary Examiner.*

BENJAMIN R. PADGETT, *Examiner.*

S. J. LECHERT, JR., *Assistant Examiner.*